United States Patent Office 3,220,947
Patented Nov. 30, 1965

3,220,947
AGENT FOR THICKENING AQUEOUS LIQUIDS
Edgar W. Sawyer, Jr., Metuchen, N.J., assignor to Minerals & Chemicals Philipp Corporation, Menlo Park, N.J., a corporation of Maryland
No Drawing. Filed June 26, 1962, Ser. No. 205,228
5 Claims. (Cl. 252—8.5)

The subject invention relates generally to the thickening of aqueous liquids with colloidal clay, and is concerned especially with water-based drilling muds and an improved thickening agent therefor.

In the rotary drilling of wells, a drilling mud or fluid is introduced into the formation to remove the cuttings, cool the bit and seal formations. The mud must be sufficiently viscous to carry the cuttings from the well bore and to suspend particles of weighting agent. However, the mud viscosity must not be so high as to interfere with the action of pumps which circulate the drilling fluid in the formation. Generally speaking, the Stormer viscosity of a drilling fluid should be within the range of about 10 to 40 cp., more usually about 15 to 30 cp. Colloidal clays are most generally employed to impart the desired viscosity to drilling fluids. The mud-making qualities of the clay are indicated by certain properties of an aqueous suspension of the clay. Among the most important of these properties is the yield of the clay, the term "yield" being defined as the number of barrels of mud having an apparent viscosity of 15 cp. (as determined on a Stormer-type viscometer) that can be made from one ton of clay. In the case of salt-water muds, the yield of the clay in a saturated sodium chloride solution is determined, since such a value is indicative of the performance of the mud in its intended application. The API procedure for determining mud yield is set forth in API RP 29, Standard Field Procedure for Testing Drilling Fluid, fourth edition, Section A–II, A25–A30 (May 1957).

It is very desirable to make up drilling fluids at low solids to obtain faster bit penetration rates. Therefore, it is highly advantageous to make up muds with the highest yield clay available. However, in selecting a clay for use in drilling a formation, careful consideration must also be given to the choice of a clay which can tolerate any contamination expected to be encountered during drilling without appreciable yield reduction. If a mud is made up with a clay, such as swelling bentonite clay, whose mud yield decreases appreciably upon contamination, excessive clay solids will be needed to develop sufficient viscosity in the system to remove cuttings from the well bore unless expensive additives are employed with such clay.

Therefore, when sea water or brine must be used in making up a drilling mud, or when formations of soluble salts of Na, Ca and Mg are expected to be encountered in drilling, a recommended procedure is to use a special type of clay or fullers earth which is mined in Georgia and Florida instead of local clays or commercial bentonite drilling mud clay. This unique type of clay, known as "attapulgite clay," is particularly useful for low solids salt water, gyp and high temperature muds because salt and other electrolytes, as well as high temperature, do not adversely effect the colloidal properties of this clay as they do bentonite clay. This is because the mud-making properties of attapulgite clay do not depend upon particle hydration. Instead, attapulgite clay thickens water as a result of a unique orientation of charged colloidal attapulgite needles in the dispersion medium brought about by shearing the clay in the aqueous medium.

Perhaps the most noteworthy advance in the field of making salt-water drilling fluids has been the recent introduction of mixtures of attapulgite drilling mud clay with small amounts of hydratable MgO or $Mg(OH)_2$. These mixtures, described in a copending U.S. patent application, Serial No. 116,607, filed June 12, 1961, of which I am a coinventor, have been widely accepted by the industry and at present account for a substantial proportion of the total volume of attapulgite drilling mud clay employed. The optimum saturated salt-water yield of mixtures of attapulgite drilling mud clay with hydratable MgO is about 200 bbl./ton as compared with an optimum yield of about 150 bbl./ton for a selectively mined attapulgite clay without magnesium base additive.

An object of this invention is the provision of a simple, economical chemical treatment for effecting a further and substantial increase in the mud yield of attapulgite drilling mud clay in most contaminated or semicontaminated systems.

A more particular object of this invention is the provision of an improvement in the mud yield of admixtures of attapulgite clay with magnesium base additive.

Still another object of this invention is the provision of a versatile attapulgite clay drilling mud clay admixture containing additives which function synergistically to improve the mud yield of attapulgite clay.

A more particular object is the provision of an attapulgite drilling clay admixture having an API saturated salt-water mud yield which is at least about 100% greater than the yield of the clay per se.

Another object of this invention is the provision of an improved method for making up aqueous drilling muds with attapulgite clay.

Further objects and advantages will be readily apparent.

After extensive experimentation with mixtures of colloidal clays with a multiplicity of inorganic and organic additives, both natural and synthetic, with an object of effecting improvements in the mud-forming properties of colloidal clay, a colloidal clay composition has been developed which is markedly superior to commercial clay thickening agents, including the magnesium base treated attapulgite clay of said copending application. The compositions of this invention, which are especially useful in producing salt-water drilling mud or muds expected to be contaminated with $Na^+$, $Ca^{+2}$ or $Mg^{+2}$, have mud yields in salt-water systems and contaminated systems that represent a spectacular improvement over the yield of salt-water drilling clays heretofore available.

Stated briefly, the improved thickening agent of this invention, which is in the form of a finely divided mixture, contains three essential ingredients: namely, a colloidal grade of attapulgite clay; a small amount of a particular hydrotropic colloidal polymer, namely unoxidized mannogalactan derived from guar (e.g., guar flour); and a small amount of a magnesium compound selected from the group consisting of hydratable MgO and $Mg(OH)_2$, preferably the former, which is generally more effective. Accordingly, this invention will be described with especial reference to the use of hydratable MgO although generally similar results can be expected by employing $Mg(OH)_2$.

Yields of mixtures of attapulgite clay with small amounts of the combination of unoxidized mannogalactan and hydratable MgO exceed to a remarkable degree the yield that can be obtained with attapulgite clay and either additive used singly. For example, with one sample of attapulgite drilling mud clay having a yield of 130 bbl./ton in saturated NaCl, the optimum saturated NaCl yield obtainable with hydratable MgO as the sole additive to the clay was somewhat less than 160 bbl./ton, a result attained with addition of 1% MgO. With larger increment of MgO addition to the clay, yield decreased until, at the 5% MgO level, the yield was lower than that of the clay without MgO additive. The optimum saturated salt-water obtainable with the clay through addition of unoxidized guar flour was 200 bbl./ton, a yield realized by using 1% guar. With further increment of guar, mud yield decreased well below the 200 bbl./ton level. In contrast with optimum yield improvements of roughly 25% and 55% obtained with MgO and guar, respectively, when these additives were employed singly, small amounts of the combination of MgO and guar with the clay resulted in 95% to 130% improvements in the saturated NaCl yield of the clay.

While not wishing to be bound to any explanation for this phenomenon, present experience indicates that the hydratable MgO prevents surface adsorption of the guar by the attapulgite clay, which would limit the effectiveness of the guar as a thickening agent, and that the guar in turn disperses more readily in aqueous media than the clay. It is believed whereby the colloidal properties of the attapulgite clay are more fully developed when the clay is agitated in aqueous media previously thickened somewhat by the guar dispersion. Thus, the organic polymer is markedly hydrophilic and develops its full viscosity in aqueous systems with mere mild agitation, in contrast with attapulgite clay, a so-called "hydrophobic clay," which requires intensive shearing to bring out its full colloidal properties. Therefore, when a mixture of MgO and attapulgite clay is agitated in an aqueous liquid in the presence of guar, the guar will body the aqueous phase of the system before dispersion of the clay ingredient is completed. Present experience indicates that dispersion of the clay is more complete in a liquid vehicle that has been slightly prethickened with unoxidized guar than the dispersion of the same clay would be in a more fluid vehicle. The more complete dispersion of the clay in the guar thickened vehicle would account for the superior thickening of the vehicle by the clay. As a corollary, the more complete dispersion of the clay and MgO in a liquid vehicle also containing guar would account, at least in part, for the synergistic effect on mud yield of the combination of guar and MgO with the clay. This effect of guar on attapulgite clay-MgO admixtures is the opposite of the effect of the guar on hydratable clay. In the former case, the effect of guar addition is to increase dispersion of the attapulgite. In the latter case, guar prevents hydration and dispersion of a hydratable clay, such as bentonite clay, and such effect is utilized in carrying out the teachings of U.S. 2,854,407 to Mallory which relates to the drilling of hydratable formations with muds containing guar.

A feature of this invention is that the principal function of the guar in the mud-forming composition is essentially a temporary one, namely to permit the optimum colloidal properties of the MgO-attapulgite mixture to be developed and, therefore, compositions of this invention containing clay and MgO with guar are virtually free from highly objectionable features of prior art mud systems thickened with guar alone. For example, the viscosity of the latter muds breaks down with prolonged shearing while the viscosity of admixtures of this invention containing guar is actually improved by prolonged shearing. Moreover, fermentation of guar thickened muds in mud pits or in the bore hole, which results in a loss of mud viscosity, does not occur to an appreciable extent with muds of this invention containing colloidal attapulgite clay. Likewise, the extremely rapid breakdown in viscosity of guar based muds when they are subjected to high temperature is not characteristic of muds of this invention which possess substantially the temperature stability of attapulgite clay-MgO admixtures in the absence of guar.

While the additives employed with the colloidal attapulgite in carrying out this invention add somewhat to the cost of the thickening agent, on a weight basis, nevertheless, in terms of the thickening power or mud-making efficiency of a given weight of composition, the use of the additives with the clay brings about a significant reduction in the cost of producing a barrel of drilling mud of suitable viscosity. The economics of drilling with the mud made up in accordance with this invention is also markedly superior to the economics of drilling with muds made up with guar alone, attapulgite alone or the combination of attapulgite clay and MgO or the combination of attapulgite and guar in the absence of MgO.

Mud-forming admixtures of this invention consisting essentially of attapulgite clay, hydratable MgO and unoxidized mannogalactan can be made up into drilling fluids by agitating a previously formed admixture of these ingredients into fresh water or into aqueous solutions of salt, gypsum or the like. Less desirably, the magnesium compound and/or the vegetable colloid additive can be incorporated separately into the aqueous phase of the mud. It is of the essence of this invention, however, that the unoxidized mannogalactan material be present with the attapulgite clay and MgO at the time when the clay is agitated in the aqueous system to disperse the clay. No special equipment is needed since the usual pumps, mud guns and agitators used in making up attapulgite drilling muds may be employed.

When drilling formations containing salt beds, salt domes, gyp, anhydrite and/or combinations thereof, our novel fluids, even those made up with fresh water, will maintain substantially their high yield upon contamination without the necessity for chemical treatment required with bentonite muds.

Drilling muds of this invention have yield points, gel strengths, densities and water-loss properties essentially the same as those made up with attapulgite drilling clay in the absence of the magnesium compound and unoxidized mannogalactan additives.

The yield of admixtures of this invention will vary somewhat with the system in which yield is measured, with the starting clay, with the quantities and proportions of magnesium base material and unoxidized mannogalactan used, and with the processing employed. Different samples of attapulgite clay, while having essentially the same chemical analysis, will normally vary somewhat in their response to treatment with given quantities of magnesium base material and guar. With most attapulgite clays, the use of quantities of additives selected to produce synergistic improvement in yield will result in admixtures having saturated salt-water yields which represent an improvement of at least 100% over the yield of the particular sample of clay employed in producing the admixture. This, in effect, means that no more than 1000 pounds of the attapulgite clay admixture will suffice when formerly a ton of the same grade of attapulgite clay was required. This result is normally obtained simultaneously with an improvement of at least 100% in fresh-water yield and an improvement of the order of about 60% in gyp yield.

Attapulgite clay admixtures of this invention are especially adapted for use in making up drilling muds whose aqueous phase contains NaCl in excess of 50,000 p.p.m., especially 350,000 p.p.m. (saturated NaCl). They are, of course, equally useful in making up fresh or semicontaminated muds adapted for drilling formations containing salt domes or high pressure salt-water flows. The admixture may also be especially advantageous in making up gyp and salt-solubilized gyp muds. When the admixtures have fresh water yields of 250 bbl./ton or more, less than half as much of the admixture will produce a mud of the same viscosity as a good grade of Wyoming bentonite. Therefore, such admixtures can be used to advantage in making up fresh-water muds, even when no contamination is expected to be encountered during drilling.

More specifically, in carrying out this invention, the hydratable MgO that is used may be prepared by calcining (burning) magnesite ($MgCO_3$), magnesium hydroxide or magnesium basic carbonate at a temperature within the range of about 400° C. and about 900° C. A suitable commercial grade of hydratable magnesium oxide is the so-called "caustic-burned magnesia." So-called "dead-burned magnesia" is not suitable for the purposes of this invention. Hydratable oxide or $Mg(OH)_2$ from sea water and brines can also be used. Small amounts of CaO and $Ca(OH)_2$ can be present as contaminants in the MgO or $Mg(OH)_2$. However, the presence of these contaminants in quantities that are in excess of 20% to 25%, based on the MgO or $Mg(OH)_2$ weight, impairs the yield of the subject mixtures. Moreover, the MgO or muds made up with the admixture containing MgO should be free from solubilizing agents for MgO, such as ammonium salts of mineral acids, since such materials negate the effect of the MgO.

The unoxidized mannogalactan additive employed in producing the improved mud-thickening agent is a colloidal polysaccharide consisting of a complex carbohydrate polymer of galactose and mannose. The material is commercially produced in the form of a 40 to 200 mesh powder obtained from various leguminous seeds by wet or dry milling. The ratio of galactose to mannose in mannogalactans varies with the species of seed from which the material is obtained. Guar flour, obtained by milling the endosperm of the legume known as "*Cyanopsis tetragonoloba*," is the preferred source of the unoxidized mannogalactan employed in carrying out this invention.

By the term "attapulgite clay" is meant a clay material whose predominant mineral species is the clay mineral attapulgite. Attapulgite is a hydrous magnesium aluminum solicate of the empirical formula:

$$(OH_2)_4(OH)_2Mg_5Si_8O_{20}\cdot 4H_2O$$

Trivalent cations such as $Al^{+3}$ are equivalent to 1.5 $Mg^{+2}$ and may proxy for some of the magnesium (and probably some $Si^{+4}$) in this structure. A typical chemical analysis of attapulgite clay (volatile free basis) is:

|     | Percent |
| --- | --- |
| $SiO_2$ | 67.0 |
| $Al_2O_3$ | 12.5 |
| MgO | 11.0 |
| $Fe_2O_3$ | 4.0 |
| CaO | 2.5 |
| Others | 3.0 |
|     | 100.0 |

While in the analysis the magnesium and aluminum are expressed as oxides, actually they are present as complex silicates, linked to silicon atoms through oxygen linkage.

The attapulgite clay employed in producing the improved thickening agent for drilling fluids is a colloidal grade of the clay, i.e., attapulgite clay which has never been dried to a free moisture (F.M.) below about 7% (free moisture being defined as the weight percent of a material eliminated by heating the material to essentially constant weight at about 220° F.). Preferably, the clay has a F.M. of at least 10% and a volatile matter (V.M.) of 20% to 25%. Volatile matter is defined as the weight percent of a material eliminated by heating the material to essentially constant weight at 1800° F. There is no upper limit to the F.M. of the clay, although usually it will not exceed 25% so as to avoid the expense of shipping large quantities of water.

The clay may be raw clay which has received no treatment other than grinding, although preferably the clay is extruded (with or without MgO or $Mg(OH)_2$ additive) before drying and grinding. Wet screening of the raw clay before extrusion may also be desirable.

In producing colloidal attapulgite clay admixtures of this invention, it will suffice to dry mix and blend thoroughly a source of unoxidized mannogalactan magnesium compound with preground clay (e.g., clay which is 100% minus 48 mesh (Tyler series)), preferably extruded ground clay. However, optimum results are usually realized when the clay is ground in the presence of the magnesium base material and vegetable colloid additives. This can be accomplished by pugging the MgO or $Mg(OH)_2$ with clay and water prior to extruding the clay and then grinding the dried extruded mixture in the presence of the vegetable colloid additive. The guar flour and powdered magnesium base material can also be thoroughly mixed with moist clay extrudate and the mixture dried and ground—this procedure appears to lead to a coating of clay particles with adherent powdered additive. Drying of the extruded clay (or extruded admixture of the clay) should be at a product temperature not to exceed about 300° F. since higher temperatures have an adverse effect on the clay yield. Thus, it will not suffice to dry the clay at product temperatures of the order of 400° F. or higher, even when drying time is limited to provide a clay having a F.M. above 7%. The particle size of the ground extruded clay or clay admixture should be 100% minus 48 mesh (Tyler series) and can be considerably finer, such as 100% minus 325 mesh.

The attapulgite clay is normally present in the drilling fluid in amount of about 10 to about 15 lbs./bbl. The quantities and relative proportions of magnesium base material and unoxidized guar are selected to effect a synergistic improvement in the saturated salt (NaCl) water yield over the saturated salt-water yield of the attapulgite clay together with either the magnesium base material or the unoxidized guar employed singly as attapulgite clay additive in any quantity up to and even exceeding combined quantity of additives that is employed. With most clays, this synergistic improvement in mud yield is realized when the source of unoxidized mannogalactan, such as guar seed flour, is employed in amount of about 50 to 75 parts by weight to about 50 to 25 parts by weight of MgO and the combination of MgO and source of unoxidized mannogalactan are used in combined amount of about 1% to 4% of the weight of clay (25% V.M. clay basis). A typical guar concentration in the drilling mud will be from about 0.1 lb./bbl. to about 0.45 lb./bbl. and typical MgO concentration will vary within the range of about 0.1 to about 0.3 lb./bbl. The quantity of guar required to increase the mud yield of the clay-MgO admixture is considerably less than the quantity of guar added to drilling muds for water-loss control purposes. However, additional quantities of guar can be incorporated into muds made up with the admixture of this invention if water-loss control is also desired. These additional quantities can be incorporated into the mud after clay dispersion is completed because the usefulness of the guar as a water-loss control agent does not depend upon effecting the dispersion of the attapulgite clay in previously dispersed guar.

Following is an example which demonstrates the exceptional improvement in saturated salt-water mud yield obtained by incorporation of guar and hydratable MgO with attapulgite drilling mud clay. This example shows that the use of the combined clay additives gives results that cannot be attained by employing either additive singly, in any proportion. In the examples, muds were made up by adding clay to 350 cc. of saturated solution of NaCl in water and stirring for 20 minutes.

All yields reported in the example are API yields and represent yields of samples stirred for 20 minutes, aged for 24 hours, then stirred for 5 minutes and evaluated.

The sample of attapulgite clay was a collodial grade, analyzing (on a volatile free clay basis) about 67.0% $SiO_2$; 12.5% $Al_2O_3$; 11% MgO; 4.0% $Fe_2O_3$; 2.5% CaO; others 3.0%.

Effect of MgO addition to attapulgite drilling mud clay

Raw attapulgite clay (F.M. about 44%, V.M. about 50%) from a deposit known to provide commercially acceptable drilling mud clay was pugged at room temperature with various quantities of calcined (caustic burned) magnesite and water sufficient to provide a mix of extrudable consistency (V.M. about 60%). The pugged mixture was extruded in an auger extruder through a die plate having a ½-inch thickness and ¼-inch holes, producing pellets about ¼-inch to ½-inch long. The extruded pellets having a V.M. of about 58% were dried in a rotary externally fired dryer for about one hour to a V.M. of about 25% at a dryer temperature of 250° F. to 300° F. The dried pellets were fed to a Raymond roller mill provided with a classifier to remove sand and were milled to 100% minus 48 mesh and about 50% minus 325 mesh (Tyler). The procedure was repeated to produce extruded clay containing no calcined magnesite as a control.

The optimum improvement in yield of the attapulgite clay was obtained by the addition of 1.00% by weight of MgO to the clay (25% V.M. clay basis) to produce a mixture having a saturated salt-water mud yield of 157 bbl./ton. This yield was an improvement of 27 bbl./ton over the yield of the control clay, representing a 23% yield increase.

Effect of guar addition to attapulgite drilling mud clay

When unoxidized guar seed flour was used as an additive to the 130 bbl./ton extruded attapulgite drilling mud clay, the following results were obtained:

| Weight Percent Attapulgite [1] | Weight Percent Guar | API Mud Yield in Sat. NaCl, bbl./ton |
|---|---|---|
| 100.00 | --- | 130 |
| 99.75 | 0.25 | 150 |
| 99.50 | 0.50 | 180 |
| 99.00 | 1.00 | 200 |
| 98.50 | 1.50 | 190 |
| 98.00 | 2.00 | 185 |
| 97.00 | 3.00 | 150 |

[1] Containing 25% V.M.

The data show that the optimum improvement in mud yield obtained by addition of guar alone to the clay was the 70 bbl./ton increase obtained with 1% guar addition, representing a 54% increase in yield. Therefore, optimum improvement in mud yield that would be expected from the combined addition of small quantities of MgO and guar in any quantities would be a 97 bbl./ton increase (70 bbl./ton from the guar plus 27 bbl./ton from the MgO). In other words, the best saturated salt-water yield that could be expected from the combined addition of guar and MgO in any proportion to the clay would be a yield of 227 bbl./ton. Moreover, the yield of 227 bbl./ton would be expected using about 2% of combined additives (1% MgO and 1% guar). Using about 3% combined additives the expected yield would be 212 bbl./ton (a 27 bbl./ton increase from 1% of MgO, plus an additional 55 bbl./ton increase from the 2% guar). Employing 1% MgO and 3% guar as additives to the attapulgite clay, the expected saturated salt-water mud yield would be 177 bbl./ton.

Effect of combination of guar and MgO addition ot attapulgite clay

When unoxidized guar seed flour was used as an additive to the 157 bbl./ton. attapulgite clay containing 1.00% MgO (by grinding the guar with the moist extruded mixture of attapulgite and MgO and drying to 25% V.M.), the following results were obtained:

| Weight, Percent Guar [1] | Measured API Mud Yield in Saturated NaCl, bbl./ton | Approximate Theoretical API Mud Yield in Saturated NaCl, bbl./ton | Approximate Increase of Actual Mud Yield Over Theoretical Yield, Percent | Approximate Increase in Mud Yield Over Optimum Theoretical Yield of 227 bbl./ton, Percent |
|---|---|---|---|---|
| 0 | 157 | --- | --- | --- |
| 0.25 | 166 | 177 | --- | --- |
| 0.50 | 174 | 207 | --- | --- |
| 1.00 | 206 | 227 | --- | --- |
| 2.00 | 298 | 212 | 41 | 32 |
| 3.00 | 256 | 177 | 45 | 13 |

[1] Based on weight of weight of mixture of attapulgite and 1.00% MgO containing 25% V.M.

Results for addition of guar flour and MgO to attapulgite indicate that, if the guar and MgO functioned independently, an optimum yield of 227 bbl./ton would have been obtained with the combination of 1% guar and 1% MgO. Data for the combination of guar and MgO with attapulgite clay indicate, surprisingly, that the 206 bbl./ton yield of the combination of 1% guar and 1% MgO was less than was expected. The data show, however, the unexpectedly high yields of 256 to 298 bbl./ton were obtained by using 2% and 3% guar with 1% MgO additive and that the effect of these combinations of additives was synergistic since the yields of 256 and 298 bbl./ton were far greater than could be expected from the effects of the individual ingredients. The data also indicate that the effect of combinations of 2% and 3% guar with 1% MgO were also significantly greater than could have been reasonably expected from the effects of the individual additives in any quantity.

Evaluating the above tabulated results in terms of the effect of the guar per se (saturated salt-water yield of 2224 bbl./ton), it can be seen that 1%, 2% and 3% guar addition to any system would be expected to increase yield by about 22, 44 and 67 bbl./ton, respectively. Consequently, on this basis, the expected viscosities of mixtures of attapulgite with 1% MgO upon addition of 1%, 2% and 3% guar addition would be 177, 190 and 201 bbl./ton, respectively. Therefore, on this basis, unexpected viscosity improvement was achieved at the 1% to 3% level of guar addition whereby yields of 206, 298 and 256, respectively, were obtained.

I claim:

1. A composition adapted for use as a thickening agent in the production of salt-water drilling muds comprising a mixture of:
   colloidal attapulgite clay,
   a magnesium compound selected from the group consisting of hydratable MgO and Mg(OH)$_2$,
   and unoxidized mannogalactan obtained from guar, said magnesium compound and said unoxidized mannogalactan being present in combined amount of about 1% to 4% of the weight of said clay and in the proportion of about 50 to 25 parts by weight mannogalactan to about 50 to 75 parts by weight of said magnesium compound, the quantities of said magnesium material and said unoxidized mannogalactan additives being such as to effect a synergistic improvement in the saturated salt-water mud yield over the saturated salt-water mud yield of a mixture of said attapulgite clay containing only one of said additives.

2. A composition adapted for use as a thickening agent in the production of salt-water drilling muds, said composition being in the form of a finely divided admixture consisting essentially of:
   colloidal attapulgite clay,
   a magnesium compound selected from the group consisting of hydratable MgO and Mg(OH)$_2$, and unoxidized guar flour, said guar flour and said magnesium compound being present in combined amount of about 1% to 4% of the weight of said clay and in the proportion of about 50 to 75 parts by weight of guar flour to about 50 to 25 parts by weight of said magnesium compound, the quantities of said magnesium material and said guar flour being such as to effect a synergistic improvement in the saturated salt-water mud yield over the saturated salt-water mud yield of a mixture of said attapulgite with either said magnesium material or said guar flour employed singly.

3. An improved drilling mud which comprises an aqueous phase and a thickening agent dispersed therein, said thickening agent consisting essentially of:

colloidal attapulgite clay in amount of about 10 to about 15 lbs./bbl., hydratable MgO and guar flour, said MgO being present in amount of about 0.1 to about 0.3 lb./bbl. and said guar flour being present in amount of about 0.1 to about 0.45 lb./bbl., the quantities of said MgO and said guar flour being such as to effect a synergistic improvement in the saturated salt-water mud yield over the saturated salt-water mud yield of a mixture of said attapulgite clay with either said MgO or said guar flour used singly.

4. A method for making a drilling mud which comprises forming a mixture containing a small amount of unoxidized guar, colloidal attapulgite clay and a small amount of magnesium compound additive selected from the group consisting of hydratable MgO and Mg(OH)$_2$, said unoxidized guar flour and said magnesium compound being employed in combined amount of about 1% to 4% of the weight of said clay and in the proportion of about 50 to 75 parts by weight of guar flour to about 50 to 25 parts by weight of said magnesium compound, and agitating the resulting mixture into an aqueous liquid, whereby the unoxidized guar flour and magnesium compound effect a substantial improvement in yield of the clay in the aqueous medium.

5. A method for making a drilling mud which comprises dispersing unoxidized guar in water using sufficient guar to thicken the water, and then dispersing in the water, previously thickened with guar, a mud-forming quantity of colloidal attapulgite clay and a magnesium compound selected from the group consisting of hydratable MgO and Mg(OH)$_2$, said magnesium compound being present in amount within the range of about ¼% to 2% of the weght of said clay.

References Cited by the Examiner

UNITED STATES PATENTS

| | | | |
|---|---|---|---|
| 1,795,011 | 3/1931 | Gross | 252—309 |
| 1,867,063 | 7/1932 | Dawe | 252—309 |
| 2,665,259 | 1/1954 | Buffett | 252—455 |
| 3,046,221 | 7/1962 | Dodd | 252—8.5 |
| 3,081,260 | 3/1963 | Park | 252—8.5 |

OTHER REFERENCES

Rogers: Composition and Properties of Oil Well Drilling Fluids, revised ed., Pub. 1953, by Gulf Pub. Co., of Houston, Texas, pages 222 and 223.

JULIUS GREENWALD, *Primary Examiner*.

UNITED STATES PATENT OFFICE
CERTIFICATE OF CORRECTION

Patent No. 3,220,947                              November 30, 1965

Edgar W. Sawyer, Jr.

It is hereby certified that error appears in the above numbered patent requiring correction and that the said Letters Patent should read as corrected below.

Column 3, line 26, for "agent, and" read -- agent. It is believed --; line 28, strike out "clay. It is believed" and insert instead -- clay, --; column 8, line 28, for "the" read -- that --; column 10, line 17, for "weght" read -- weight --.

Signed and sealed this 27th day of September 1966.

(SEAL)
Attest:

ERNEST W. SWIDER                                    EDWARD J. BRENNER
Attesting Officer                                          Commissioner of Patents